(No Model.)  8 Sheets—Sheet 1.
J. B. BELL.
TYPE SETTING MACHINE.
No. 578,713.  Patented Mar. 16, 1897.
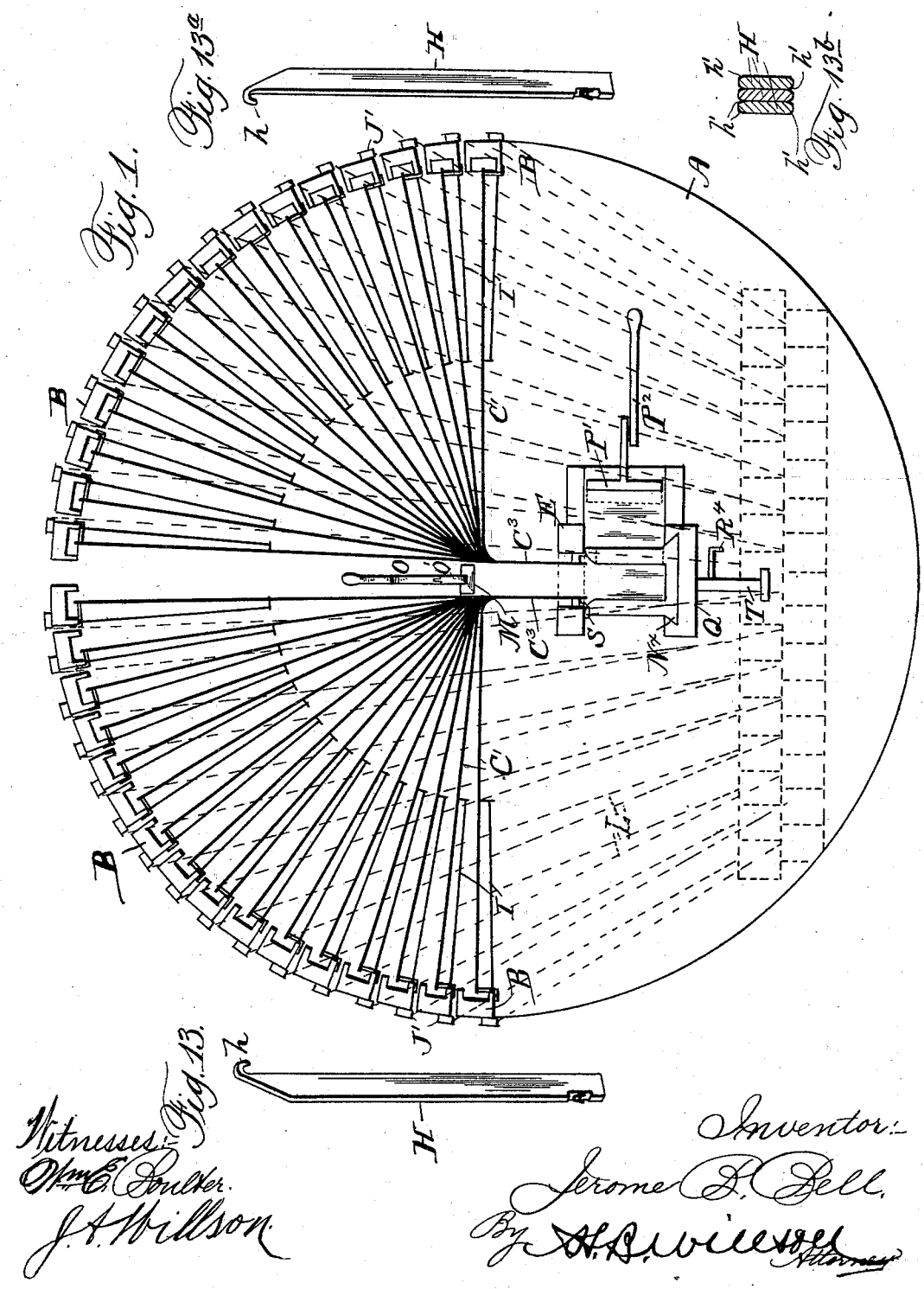

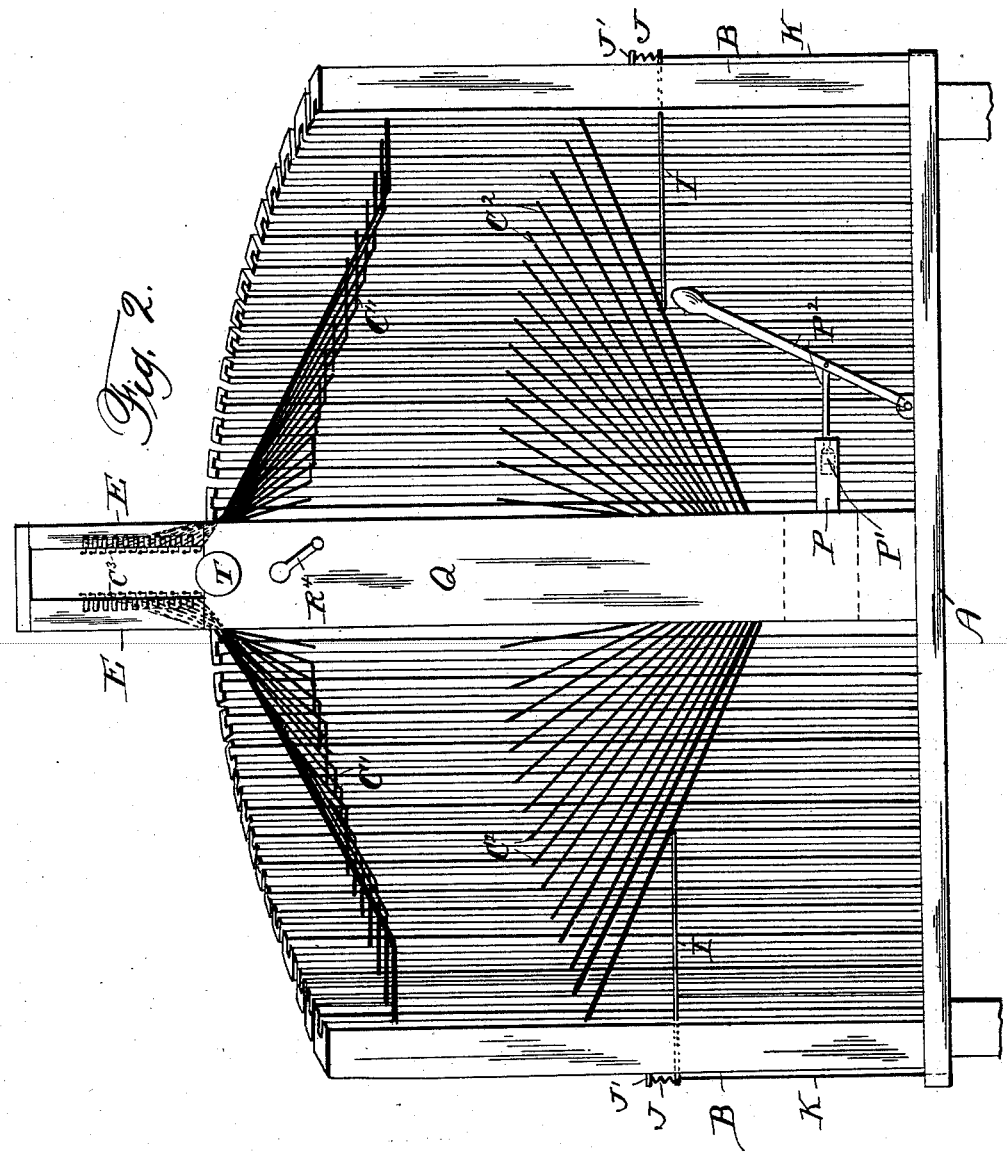

(No Model.)　　　　　　　　　　　　　　　　　　8 Sheets—Sheet 3.
J. B. BELL.
TYPE SETTING MACHINE.
No. 578,713.　　　　　　　　　　Patented Mar. 16, 1897.
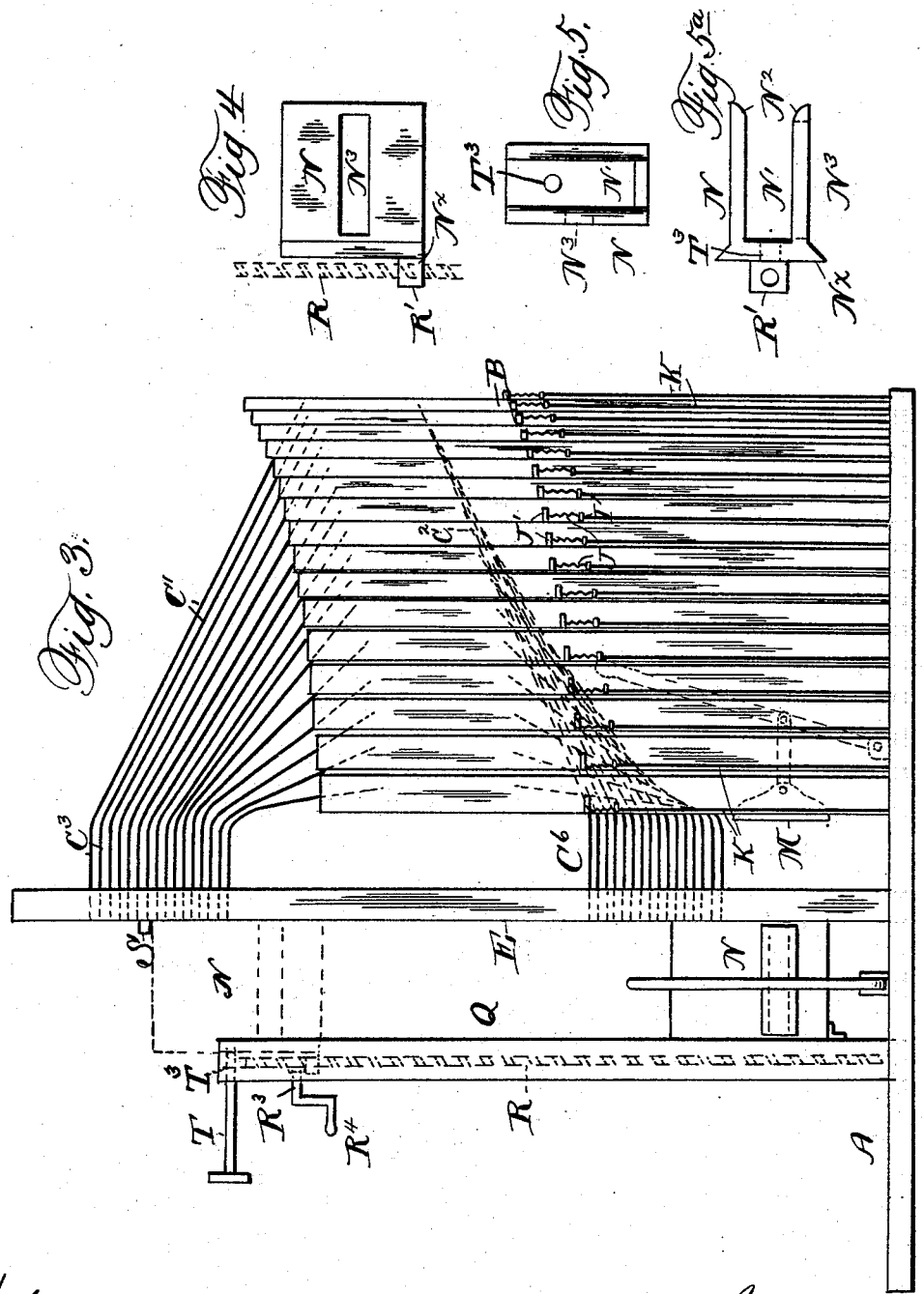

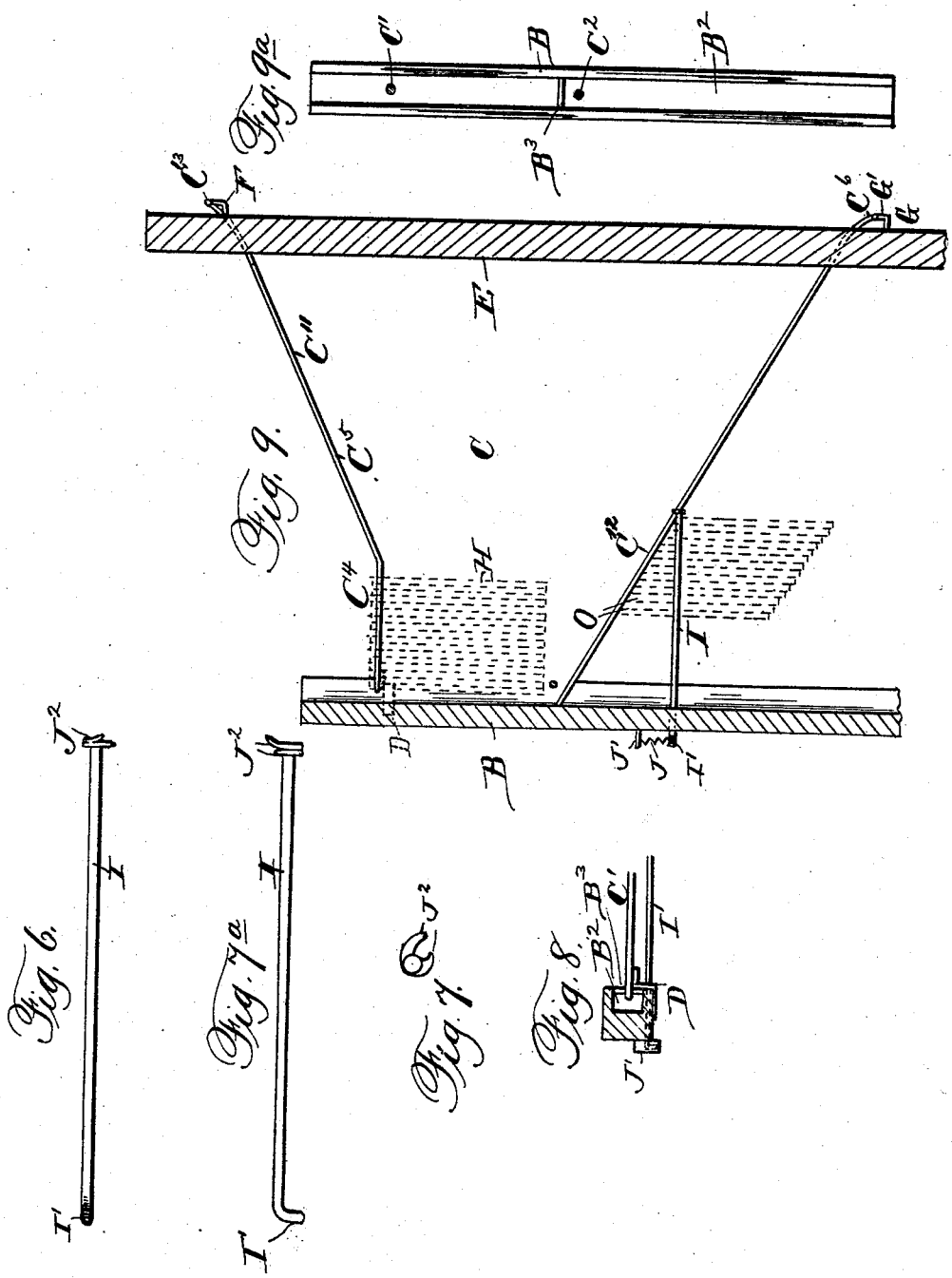

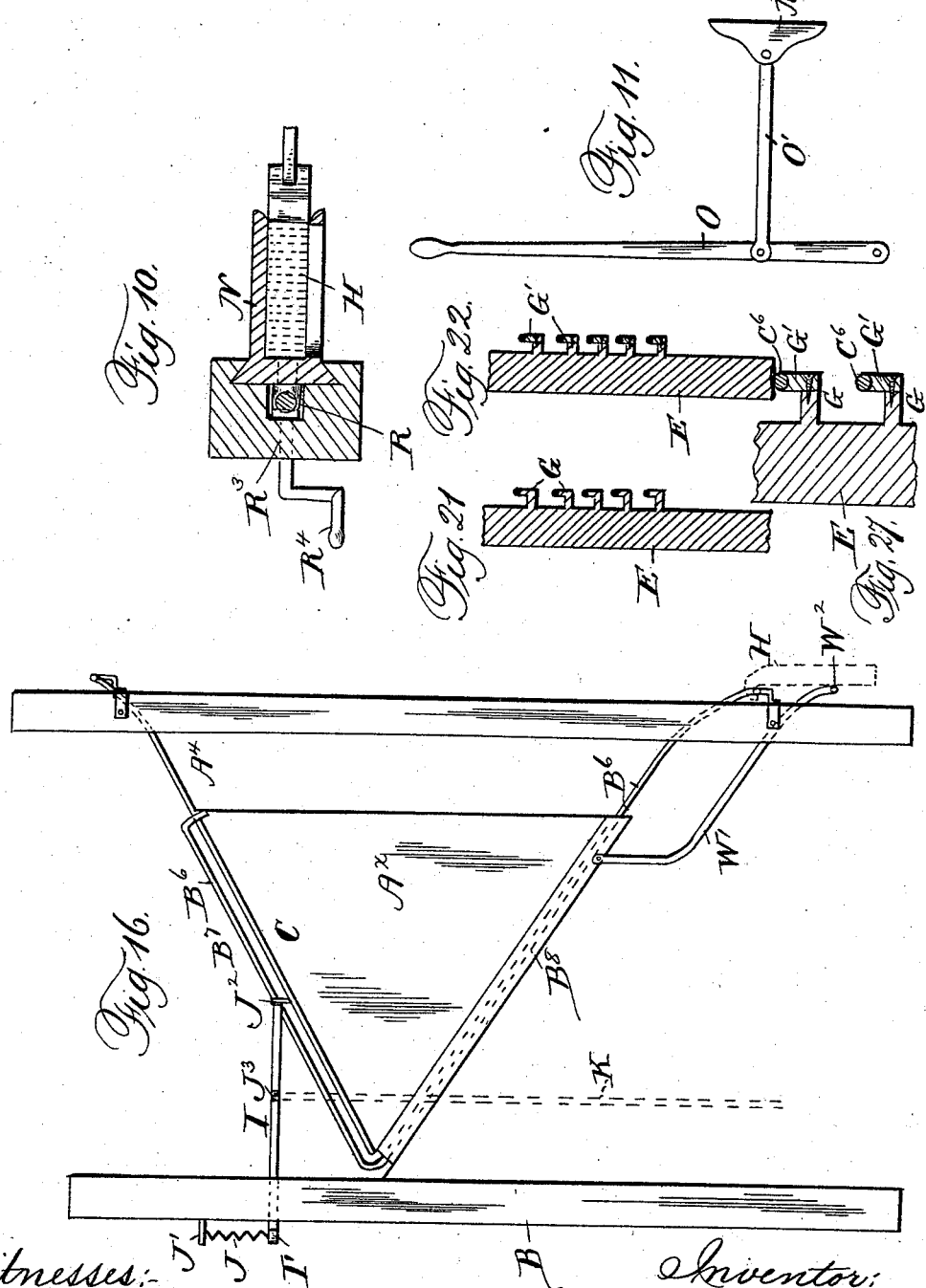

(No Model.) 8 Sheets—Sheet 6.
J. B. BELL.
TYPE SETTING MACHINE.
No. 578,713. Patented Mar. 16, 1897.
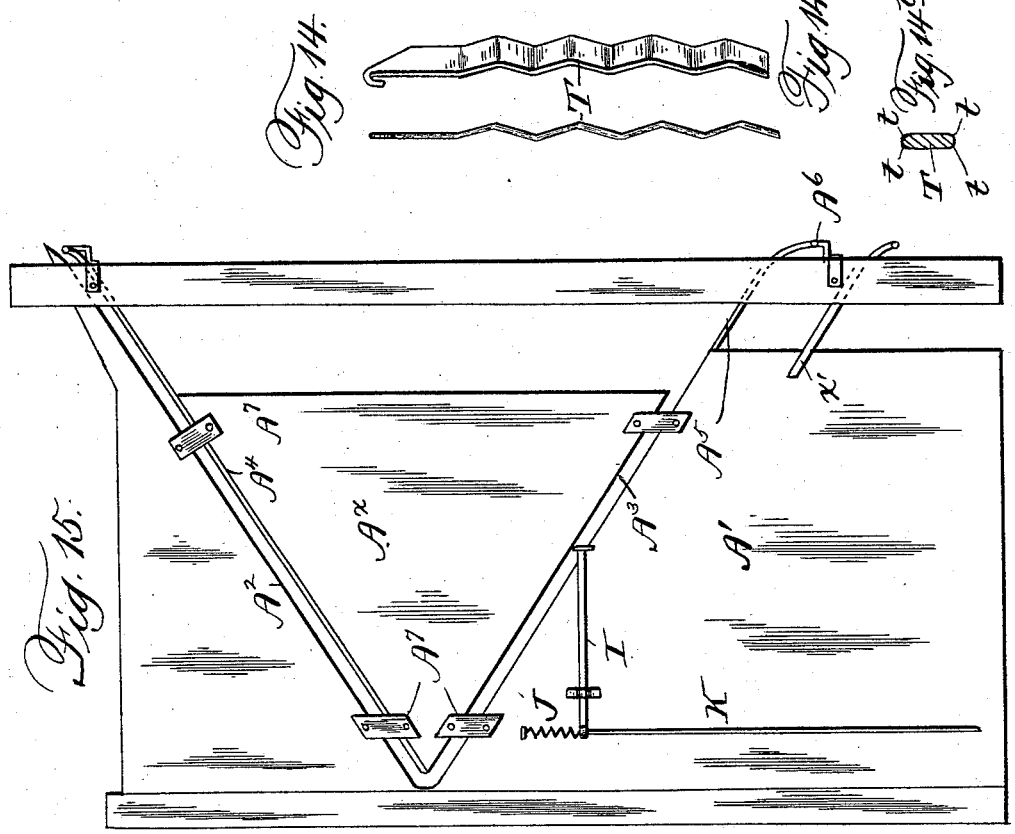
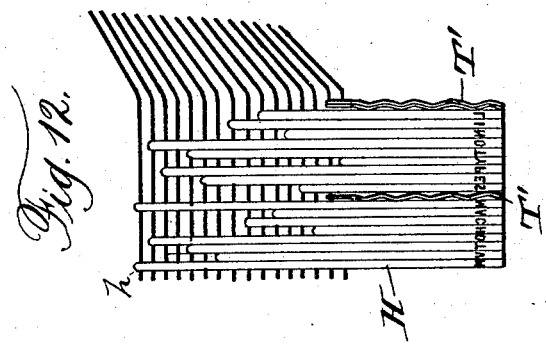
Witnesses:
Wm E Soulter
J A Willson
Inventor:
Jerome B Bell
By H A Willson
Attorney (No Model.) 8 Sheets—Sheet 7.
J. B. BELL.
TYPE SETTING MACHINE.
No. 578,713. Patented Mar. 16, 1897.
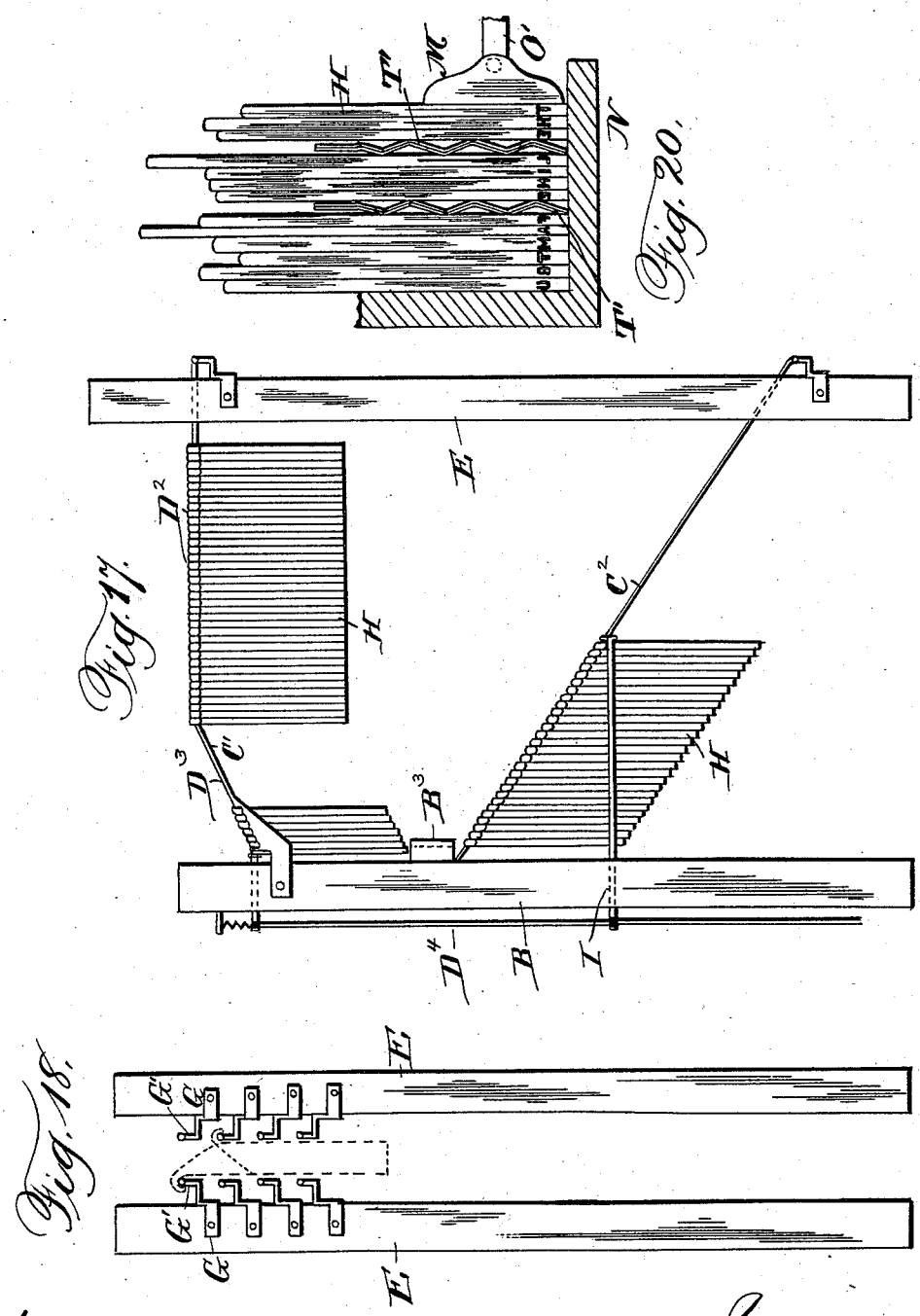

(No Model.) 8 Sheets—Sheet 8.
J. B. BELL.
TYPE SETTING MACHINE.
No. 578,713. Patented Mar. 16, 1897.
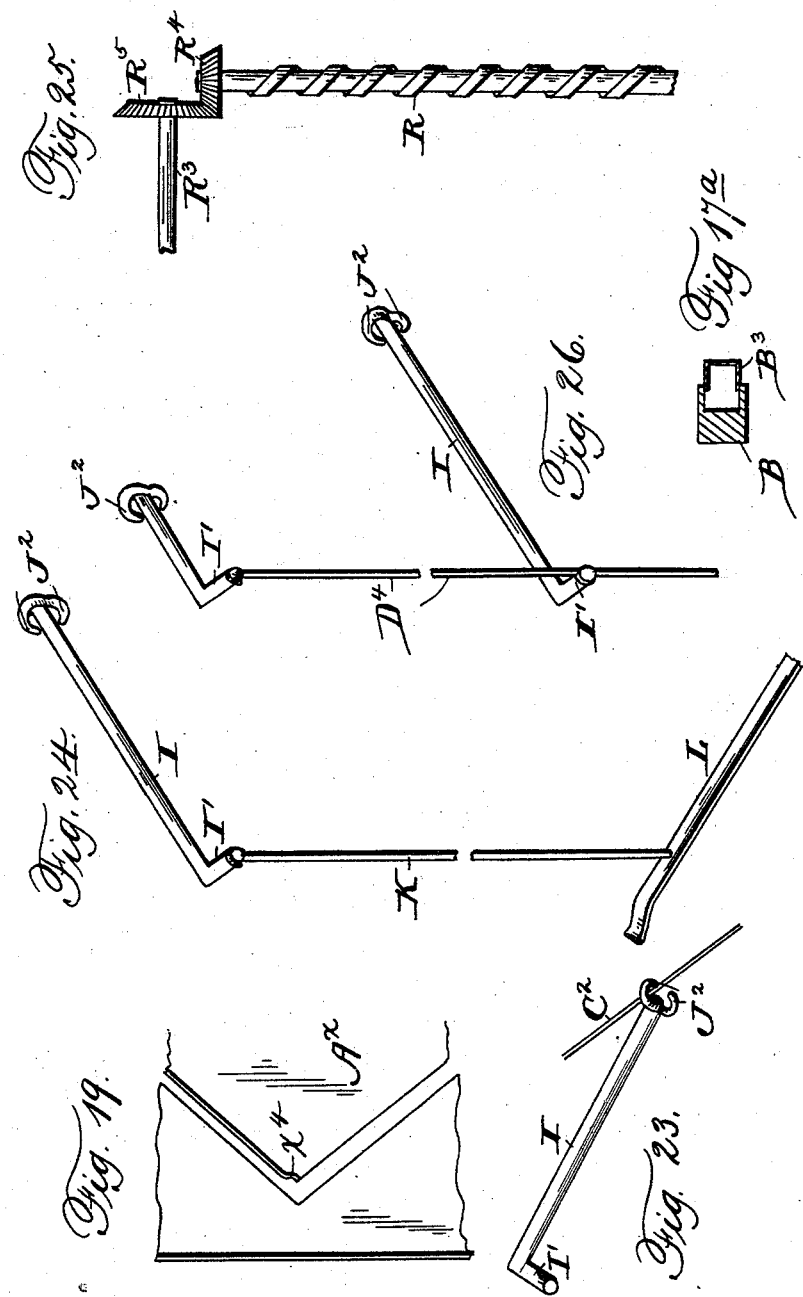

UNITED STATES PATENT OFFICE.

JEROME B. BELL, OF WILMINGTON, DELAWARE.

TYPE-SETTING MACHINE.

SPECIFICATION forming part of Letters Patent No. 578,713, dated March 16, 1897.

Application filed April 9, 1894. Serial No. 506,922. (No model.)

*To all whom it may concern:*

Be it known that I, JEROME B. BELL, a citizen of the United States, residing at Wilmington, in the county of New Castle and State of Delaware, have invented certain new and useful Improvements in Type-Setting Machines; and I do declare the following to be a full, clear, and exact description of the invention, such as will enable others skilled in the art to which it appertains to make and use the same.

My invention has relation to so-called "type-setting" or "line-making" machines for forming stereotype-matrices; and among the objects sought to be attained by my invention are to provide a machine which is comparatively simple and inexpensive in construction, very compact, easily and quickly operated, and in which the justification of the lines of type may be readily and nicely attained.

Many other objects and advantages of my invention will hereinafter appear from the following description taken in connection with the accompanying drawings; and my invention consists in the novel construction, arrangement, and combination of parts, as hereinafter fully described, illustrated in the drawings, and pointed out in the appended claims.

In the drawings, Figure 1 is a plan view of a machine constructed in accordance with my invention, the keys and key-levers being shown in dotted lines. Fig. 2 is a front view thereof. Fig. 3 is a side view. Fig. 4 is a side elevation of the galley detached. Fig. 5 is a front edge view, and Fig. $5^a$ a plan view, of the same. Fig. 6 is an enlarged detail view of the latch or releasing device for the type-bars or matrices. Fig. 7 is an enlarged detail end view thereof; Fig. $7^a$, a plan view of the same. Fig. 8 is a horizontal sectional view of one of the guideway supporting-standards. Fig. 9 is a detail side view of one of said ways; Fig. $9^a$, a face view of one of the supporting-standards for the ways. Fig. 10 is a horizontal sectional view showing the arrangement of the galley and the means for raising the same. Fig. 11 is a plan view of the means for gripping the assembled type in the galley. Fig. 12 is a view illustrating a number of type assembled on the assemblage portions of the ways. Figs. 13 and $13^a$ are perspective views of the type or type-bars employed in my machine. Fig. $13^b$ is a horizontal sectional view of several type-bars, slightly enlarged, showing them lying against each other as they do in practice while upon the way. Figs. 14 and $14^a$ are edge and perspective views of the space which I employ. Fig. $14^b$ is a horizontal sectional view of a space. Fig. 15 is a side view of a modified construction of way. Fig. 16 is a similar view of still another modified construction of way. Fig. 17 is a side elevation showing further modified arrangements of the ways and escapement devices. Fig. $17^a$ is a horizontal section through a support B and guard $B^3$. Fig. 18 is a front view showing the arrangement of the supporting-plates for the ends of the ways. Fig. 19 is a perspective view of a portion of the way seen in Figs. 15 and 16, showing the offset $X^4$. Fig. 20 is a sectional view showing the type-bars or matrices and space-bars clamped in the galley. Figs. 21 and 22 are sectional views showing different constructions of the supporting-plates for the ways. Fig. 23 is a detail perspective view showing more clearly the arrangement of the escapement device. Fig. 24 is a similar view of the means for actuating the escapement device. Fig. 25 is a detail view of a means for raising and lowering the galley. Fig. 26 is a perspective view of the double latch or escapement device. Fig. 27 is a sectional view, enlarged, illustrating the construction of way seen in Fig. 22.

In carrying out my invention I provide a suitable bed or table A, adapted to support all the operative parts of the machine and which bed or table may be supported upon suitable legs. Secured to the bed or table, near its rear edge, are a series of vertically-arranged uprights B, which extend in a semicircle, as shown. Said uprights may be either formed separate from each other or form a continuous semicircular wall.

C, Fig. 3, indicates a series of ways or supports for the type-bars prior to their being assembled to form a matrix and constructed to permit said type to descend by gravity along the same to the point of assemblage and to support the assembled type in the manner presently described.

In practice there will be a sufficient number of the supports, ways, or guides for full alphabets of lower and upper case letters, punctuation-marks, figures, and spaces that are likely to be used in setting up in type-bars any and all reading matter, and although for the sake of clearness I show only a partial number of two series that would in practice be used it will be understood that the machine will in practice be constructed to embody ways or supports for all the characters to be used in setting up the matter. Each of the ways is adapted to support a number of type of one kind, and the various kinds of type in combination constitute a font capable of setting up any ordinary line for reading matter, as it is the object of my machine to set up one line at a time, justify such line, take an impression therefrom to form a matrix, and then distribute the line and repeat the described operation, whereby a column of matrices is produced in a galley ready for casting a stereotype-plate either in one line, in full column, or in paragraphs.

As more clearly shown in Figs. 3 and 9, each way comprises an upper wire or rod ($C'$ in Fig. 3 and $C''$ in Fig. 9) and a lower wire or rod, ($C^2$ in Fig. 3 and $C^{12}$ in Fig. 9,) which are arranged at reverse inclinations, as shown. The wires $C'$ $C''$ are curved at each of their inner upper ends to form the slightly-inclined portion $C^3$ in Fig. 3 and $C^{13}$ in Fig. 9, and the lower end of the wire $C''$ is curved to form the horizontal portion $C^4$, the said portions $C^{13}$ $C^4$ being connected by the intermediate inclined portion $C^5$. The portion $C^4$ may, instead of being horizontal, be made inclined, so that the wire $C'$ would be inclined all the way. The arrangement shown is, however, the better. The outer end of the portion $C^4$ terminates a slight distance from its upright B, by which it is supported in any suitable manner, as, for instance, by means of a plate or wire D. The portion $C^3$ of the way is supported upon an upright E rising from the bed or table, said portion of the way being supported upon a plate or wire F, secured to the upright.

The lower wire $C^2$ has the inclined portion terminating at its lower end in the horizontal portion $C^6$, the latter portion being supported by the upright E by means of the plate G, having a projecting lug or arm $G'$. The upper end of the inclined portion terminates within the supporting-upright B.

In arranging the ways C in the machine they are positioned radially with very slight spaces between, sufficient only to permit the free descent of the type-bars, as presently described. Said ways are arranged in successively higher positions to bring the upper and lower ends of the ways one above the other in a vertical plane. It is my object in order to economize in space to make the machine as compact as possible and to obviate the disadvantages of constructing all the type-bars employed of different lengths. To accomplish this, I arrange the ways in two series, one series constituting the type-bars on the left of the machine, which are in successively higher planes beginning at the outermost one on the left, the other series constituting the ways on the right of the machine, which are also in successively higher planes beginning at the outermost one on the right. The ways on the left have their termini in one vertical plane, while the ways on the right have their termini in another vertical plane adjacent to but separate from the first, as seen in Fig. 1.

The supporting plates or lugs G may be made L-shaped and integral with the uprights E, if desired, as seen in Fig. 21, or the arm $G'$ of the lugs may be made separate from the remaining portions of the lugs, as in Figs. 22 and 27, and suitably secured, as by screws, to said remaining portions.

H, Fig. 13, indicates the type-bars or matrices of any suitable metal, but preferably of steel or steel-faced, each of said bars bearing upon one edge in relief or in intaglio, as may be desired, the letter or character from which latter an impression is to be taken when set up within the galley to be presently described, for my machine may be used either upon the casting principle or the die principle.

The bars H are provided at their upper ends with hooks $h$ to adapt them to be hooked over the ways and be supported thereby. The bars H are of course to be made of varying lengths, whereby when the same are assembled preparatory to taking an impression therefrom all the characters on the bars will be in the same horizontal line.

Owing to the arrangement of the ways C, that is to say, being arranged in two series having their termini in two vertical planes, I form the characters on the bars H comprising the series on the left of the machine, as before described, at the vertical edge of the bars opposite to that on which the hooks are formed, (see Fig. 13,) while the characters on the bars H in the series on the right of the machine are formed on the opposite edge of the type-bars, the edge on which the hooks are formed, (see Fig. 13$^a$,) so that when the bars H are assembled preparatory to obtaining an impression the characters on all the bars will be in position to be acted upon by the material for taking the impression.

Inasmuch as the type-bars when suspended on the ways must be kept from moving downward on the latter until released by the operator by their respective finger-keys means must be provided for holding the type-bars on the ways, such means to be operated to release the type-bars from the finger-keys through suitable intermediate connections. The means that I employ consist of a horizontally-arranged bar I, supported in suitable bearings and having its outer end bent at an angle, as at $I'$, Figs. 7$^a$ and 9, to which is connected one end of a coiled spring J, whose upper end is secured to a suitable bearing-piece $J'$. The inner end of the bar I is provided with an escapement device comprising two lips $J^2$, lying in different vertical planes. The lip on the outer end of the escapement-bar (which lip lies in a slightly different vertical plane from the other lip) normally rests against the wire or in such close proximity thereto that the lowermost type-bar rests at its hook end against said lip and is prevented from descending. Now when the escapement-bar is rocked the outer lip will be turned away from the wire to release the lowermost type-bar and allow it to descend to the assemblage-point. Just prior to this release of the type-bar the other lip will enter between the said lowermost bar and the one behind it just sufficient to hold the latter from also descending, and as soon as the lowermost bar is released the escapement-bar will be rocked back into its normal position, which causes the inner lip to release the type-bar previously held by it, and the same moves a trifle downward until it comes to rest against the outer lip ready to be released upon the next manipulation of the escapement-bar. Thus but one type-bar or matrix will be released at a time and the remaining type-bars or matrices prevented from desending until released by the operator. For operating each rock-bar I by its respective key I employ any suitable means, as, for instance, a vertically-arranged rod K, whose upper end is connected to the arm I', and whose lower end may be suitably connected to a key-lever L, Fig. 1.. As seen in Fig. 16, the rod K may be connected to a second arm $J^3$ (that may be formed on rod I) instead of to arm I'.

I preferably arrange the escapement device I in the position seen in Fig. 2, that is to say, with the lips adapted to engage the bars H after the latter reach the lower wire $C^2$, Fig. 2. A sufficient number of type-bars or matrices are to be employed to fill the horizontal upper portion $C^4$ of the wire C', Fig. 9, so that when the next letter is released from the distributing-plane its weight will cause the type at the outermost end of the horizontal portion $C^4$ to be pushed over the said end, and thus fall until its hook engages over the end of the inclined wire $C^2$ and takes its place in the rear of the line of matrices composing the "reservoir" (as I term it) O, Fig. 9.

In practice it may, in order to enable the escapement device to properly perform its function, be found necessary to make the edges of the type-bars slightly rounded, as indicated at $h'$ in Fig. $13^b$, so that when the said bars are arranged alongside of each other upon the ways the lips of the escapement device will be more readily enabled to enter between adjacent type-bars when the rack-bars are operated in the act of releasing the type-bars, as hereinbefore described. The lips of the escapement device are preferably made very thin, so as to present a sharp edge for entering between the adjacent type-bars. With the escapement device as hereinbefore described it will be understood that in practice the type-bars may be made of the same or slightly varying thicknesses, since by reason of the rounded edges the latter will act to guide the lips between the adjacent bars when the rock-bar is operated.

In order to properly guide the type-bars as they fall from the wire C' onto the wire $C^2$, I provide each of the supporting-uprights B on its front face with a guideway or groove $B^2$, Figs. 8 and $9^a$, of a width sufficient to accommodate the width of the type-bar, and in order to prevent the accidental falling out of a bar from the groove I may bridge the latter with a cross strip or bar $B^3$.

The keyboard may have any desired arrangement and may be supported in any suitable manner upon the bed or table A in position to be conveniently operated by the operator, such keyboard being represented by dotted lines in Fig. 1.

In order to firmly grip or hold the line of assembled type while an impression is being taken therefrom, I may provide any suitable means, as, for instance, a follower or plunger M, Figs. 1 and 11, arranged in rear of the galley N and to be operated in a reciprocating manner by suitable levers and in such manner as to firmly grip or clamp the line of matrices or type-bars in the galley. For operating the reciprocating follower or jaw M any suitable means may be employed, as, for instance, a suitably-pivoted lever O and link O', Fig. 11.

The galley N is arranged between the uprights E Q, Figs. 1 and 3, and comprises a box-shaped frame, which is provided with a vertical slot N', which terminates at the rear end in an open flared mouth $N^2$, through which latter the assembled line of type are adapted to be forced by means of the follower M, above described. The galley is provided in one side with a slot $N^3$, Fig. 5, which communicates with the slot N', and the length of the slot corresponds to the length of the line that is to be produced.

For taking an impression of each line of type that is produced or assembled I provide a box P, Fig. 2, arranged alongside the galley N, and in which is adapted to reciprocate a follower P', the latter being adapted to be reciprocated within the box by any suitable means, as, for instance, by the pivoted lever $P^2$ and connecting-link.

The material to be used for taking the impression (and I preferably use a soft-metal slug) is placed in advance of the follower P', and the latter serves, when operated, to force the slug against the line of assembled type, the characters being in line with the opening $N^3$ in the galley, whereby the impression may be thus quickly obtained. After an impression has been taken from the line of type the galley is to be elevated so as to bring the type in position to be distributed onto their respective ways, and in order that the galley may be guided in its upward movement for the distribution and in its downward movement to bring the galley into position to receive a new line of type I provide the galley with a dovetailed projection $N^\times$, Figs. 1, 2, and 5, which is adapted to slide within a dovetailed groove in the upright Q.

For elevating the galley any suitable means may be employed, as, for instance, a worm-shaft R, Fig. 3, which works within a lug R' on the galley, said shaft passing vertically through the upright and provided with a gear-wheel $R^4$, with which gear-wheel may mesh a gear-wheel $R^5$ on a horizontal shaft $R^3$, extending through the upright, said shaft being provided with a crank-handle $R^4$ for turning the same. A suitable stop S, Fig. 3, is provided for limiting the upward movement of the galley, and in practice such stop should be located at such a height and the type-bars and spaces should be of such length that when the galley is abutting against said stop the type-bars and spaces may be pushed out of the galley onto their respective ways, the longest type-bar engaging with the highest way, the shortest bar with the lowermost way, and the intermediate bars with their respective intermediate ways.

By means of a follower T, Fig. 3, which is simply a cylindrical rod having a head at its outer end and arranged in and adapted to be projected through the upright Q and through an opening $T^3$ in the galley, the type-bars may be pushed out of the galley onto their respective ways, down which they descend until caught in the reservoir above described.

In Figs. 15 and 16 I show modified constructions of ways or supports for the type-bars, the principle of operation being, however, the same.

In Fig. 15 the ways each consist of a metallic plate $A^\times$, arranged vertically and having the inclined slots or guideways $A^2$ $A^3$ formed therein, the type-bars being conducted down the guideways $A^2$ by means of the wire $A^4$, which is secured to the upright $A^\times$ and passes along the lower edge of the guideway $A^2$. The type-bars after descending along the wire $A^4$ fall onto and pass along the guideways $A^3$, the hook portion of the bar riding along the wire $A^5$, which is secured to the plate $A'$ on the lower edge of the guideway $A^3$ and then curved forwardly and forms the assemblage portion $A^6$, which is horizontal and secured to the upright, as described with reference to Fig. 9. The sections of the plate $A^\times$ are connected by small metallic strips or connecting-pieces $A^7$. The object of the plate $A^\times$ is to enable it to support the wire $A^4$ and at the same time to provide the inclined slots or passages along and within which the hooks on the type-bars may descend, forming a guideway therefor.

In the construction of way shown in Fig. 16 the plate $A^\times$ is triangular-shaped, and the wire $A^4$ extends along the upper edge of the plate, while a wire $B^6$ is also employed bent into triangular shape, its upper portion $B^7$ lying just above the wire $A^4$, and its lower portion $B^8$ also being arranged out of contact with the plate and being bent to form an assemblage portion, as in the previously-described constructions. The portion $B^7$ serves to prevent the type-bars from accidentally jumping off the wire $A^4$, while the portion $B^8$ serves as a guide for the type-bars which descend along the same. Sections of wire $W'$, secured at one end to the plate $A^\times$, are bent to form horizontal portions $W^2$ to guide the type onto the assemblage portions of the wires $A^5$ and $B^6$. Similar wire sections $X'$ may be employed for a similar purpose in the construction seen in Fig. 15.

With the described construction of ways the type-bars, especially when descending the ways close upon one another, are apt to become wedged or to fall one upon the other at the acute angle formed by the upper and lower portions of the ways and thus not be able to descend to the assemblage-point. To obviate this difficulty, I provide the lower portion of the way with a slight bend or offset, as seen at $X^4$, whereby the lowermost type will be carried slightly to one side just before the type-bar or matrix reaches the acute angle formed by the upper and lower portions of the way and thus be out of the way of the succeeding bar.

For temporarily holding the type-bars on the ways I employ the construction and arrangement of escapement device hereinbefore described, such escapement device being arranged in either of the two positions seen in Figs. 9 and 16.

In Fig. 17 I show a further slightly-modified construction of way and arrangement of escapement devices. In said figure I show the upper wire of the way as having the horizontal distributive portion $D^2$ and the inclined portion $D^3$. I also provide a second escapement device, the lips of which are adapted to lie adjacent to the extreme end of said inclined portion $D^3$. The portions $D^2$ $D^3$ are each adapted to contain the type-bars or matrices, as shown, and the upper escapement device is connected to the lower by a rod $D^4$ and is adapted to be operated simultaneously with the said lower escapement device applied to the lower wire of the way. Thus when the operating lever or rod for the lower escapement is operated to release a type-bar from the said lower escapement the upper escapement is simultaneously operated to allow a type-bar or matrix to fall onto the lower wire to fill the space made by the release of the bar from said lower wire.

With regard to the manner of taking an impression in the construction seen in Figs. 15, 16, and 17 I would state that when the key-levers are operated to cause the escapement devices to release the desired type-bars the latter will descend along the ways seen in said figures until they assemble upon the assemblage portions of the said ways, after which the follower will be moved forwardly to push the assembled type-bars into the galley. It will be understood that in the modified constructions seen in said figures the assemblage portions of the ways will in practice lie in precisely the same position relatively to the galley as the construction seen in Fig. 9, that is to say, in a position to allow the type-bars to be pushed off of said assemblage portions into the galley by the follower M. In Fig. 9 the type-bars after being released by the escapement devices will descend onto the assemblage portions, after which the said bars are pushed into the galley by the follower M.

I may employ the guard device $B^3$, (seen in Figs. 8, 17, and $17^a$,) which consists of a plate bent into angular shape and extending vertically in front of the groove of the supporting-standard. By this construction and arrangement there is no liability of one of the type-bars or matrices falling upon or wedging another type-bar when said matrices are operated rapidly.

By reason of the type-bars or matrices being hooked upon the ways said bars may be readily lifted off the ways at any time. Furthermore, in my machine I am enabled to use all the type-bars strung upon the ways successively instead of only a few of said bars over and over again, as is customary in this class of machines heretofore, for it will be seen that after a line has been assembled and the impression taken therefrom the type-bars or matrices that have been used in the line are distributed onto the ways again in rear of those type-bars which were not used in forming the line, thus allowing the latter bars to be used in the formation of the next line, and so on throughout the operation of assembling the type-bars or matrices for the entire matter.

In order to overcome all inconveniences and difficulties in the justification of a line, I employ the space T', (represented in Figs. 14 and $14^a$,) said space T' being constructed of spring metal and having a corrugated or undulating shape, said corrugations being shallow or deep, as may be desired, so that said space when placed between the type-bars and not subjected to compression will occupy the width of the maximum space required. The space may also be rounded at its edges, as indicated at $t$, Fig. $14^b$, similarly to the type-bars and for a like purpose. In practice it will be seen that a line need not always be "spaced out," as is the case with other machines, but with my corrugated spring-space a line may overrun its normal length within a certain limit and then be compressed by means of the plunger or follower M until the requisite length is obtained, the spaces T' readily yielding under pressure, as will be understood. In composing the line it will be understood that if a greater space is desired between any two words more than one space will be fed in between such words, as indicated in Fig. 20. It should be noted that such additional spaces are not inserted after the line is composed, but only during the setting up of the line.

In the operation of the machine the operator manipulates the keys corresponding to the type that are to be assembled, causing the escapement devices to release one type-bar at a time and when enough words are composed by reason of the escapement devices releasing the desired type-bars to allow them to assemble upon the assemblage portions of the ways, using the described spaces T' between words to fully complete a line, which spaces are set by means of the key mechanism in the same manner as the type-bars. Said line is then justified by moving the follower M forward, compressing the line to the required length. The impression is then taken from the type in the slug, and after such impression the galley is elevated and the type-bars or matrices distributed back onto their respective ways. It will be noted that the type-bars on the horizontal portions $C^6$ of the ways are pushed forwardly into the galley in the proper position for taking an impression therefrom by means of the follower M, which lying in rear of the type assembled on said horizontal portion of the way is adapted, as before described, to be pushed forwardly against the rearmost type-bar and thus forcing all of them into the galley.

Having thus described my invention, what I claim, and desire to secure by Letters Patent, is—

1. In a machine of the character described, the combination with a supporting table or bed, of ways or supports for the type-bars or matrices, said ways being arranged in two series as described, having their lower assemblage portions or ends arranged at different elevations and in two vertical planes, and their upper distributive portions also arranged at different elevations and in two vertical planes corresponding with their respective assemblage portions, and type-bars arranged to travel along the ways and having their printing-characters arranged upon opposite edges, as described.

2. In a machine of the character described, the combination with a supporting table or bed, of ways or supports for the type-bars or matrices, said ways being arranged in two series as described, having their lower assemblage portions or ends arranged at different elevations and in two vertical planes and their upper distributive portions also arranged at different elevations and in two vertical planes corresponding with their respective assemblage portions and type-bars or matrices arranged to travel along the ways and having their printing-characters arranged upon opposite edges and a vertically-movable galley adapted to receive the assembled type and to distribute said type-bars or matrices upon the distributive portions of the ways, substantially as described.

3. In a machine of the character described, the combination with a supporting table or bed, of ways or supports for the type-bars or matrices, said ways being arranged in two series as described, having their lower assemblage portions or ends arranged at different elevations and in two vertical planes and their upper distributive portions also arranged at different elevations and in two vertical planes corresponding with their respective assemblage portions, the type-bars arranged to travel along the ways and having their printing-characters arranged upon opposite edges and a vertically-movable galley comprising a box-shaped frame provided with a vertical slot adapted to receive the assembled type-bars or matrices, and a horizontal slot intersecting said vertical slot to permit an impression to be taken therethrough as described, said galley being adapted to be elevated to bring the type-bars or matrices into position to permit the type-bars or matrices to be distributed onto the distributive portions of the ways, substantially as specified.

4. In a machine of the character described, the combination with a supporting table or bed, of ways or supports for the type-bars or matrices, said ways being arranged in two series as described having their lower assemblage portions or ends arranged at different elevations and in two vertical planes and their upper distributive portions also arranged at different elevations and in two vertical planes corresponding with their respective assemblage portions, and type-bars or matrices arranged to travel along the ways and having their printing-characters arranged upon opposite edges and a vertically-movable galley comprising a box-shaped frame provided with a vertical slot adapted to receive the assembled type-bars or matrices and a horizontal slot intersecting said vertical slot to permit an impression to be taken therethrough as described, said galley being adapted to be elevated to bring the type-bars or matrices into position to permit the type-bars or matrices to be distributed onto the distributive portions of the ways and a reciprocating follower operating within the vertical slot of the galley to push the type-bars or matrices out of the same onto their respective ways, substantially as specified.

5. In a machine of the character described, the combination with a supporting table or bed, of ways or supports for the type-bars or matrices, said ways being arranged in two series as described, having their lower assemblage portions or ends arranged at different elevations and in two vertical planes, and their upper distributive portions also arranged at different elevations and in two vertical planes corresponding with their respective assemblage portions and type-bars or matrices arranged to travel along the ways and having their printing-characters arranged upon opposite edges and a vertically-movable galley adapted to receive the assembled type-bars or matrices and distribute them upon the distributive portions of the ways and a vertical upright provided with a way or groove within which said galley is adapted to slide as described.

6. In a machine of the character described, the combination with a supporting bed or table, of a series of supporting-uprights extending around a portion of said table, uprights carried by said table in front of the former uprights, a number of ways or supports for the type-bars or matrices supported by the various uprights, said ways being arranged in two series having their lower assemblage portions or ends arranged at different elevations and in two vertical planes and their upper distributive portions also arranged at different elevations and in two vertical planes corresponding with their respective assemblage portions and type-bars or matrices arranged to travel along the ways and having their printing-characters arranged upon opposite edges, a galley adapted to receive the assembled type-bars or matrices and permit an impression to be taken therefrom, and a supporting-upright for said galley, substantially as specified.

7. In a machine of the character described, the combination with a supporting bed or table, of a series of uprights carried thereby and provided with vertical grooves, a series of ways for the type-bars or matrices consisting of the upper and lower wires forming guideways or supports for the type-bars along which the latter are adapted to travel, and supported by the uprights, said wires having their outer ends terminating within the grooves of the uprights and being provided with the distributive and assemblage portions described, and uprights carried by the table to which the said distributive and assemblage portions are secured, substantially as described.

8. In a machine of the character described, the combination with a supporting bed or table, of ways or supports for the type-bars or matrices, said ways being arranged in two series as described and being provided with the reversely-inclined portions meeting at an angle and having offsets $X^4$ at such point and type-bars or matrices adapted to travel along said ways, as described.

9. In a machine of the character described, the combination with a supporting bed or table, of a series of uprights carried thereby and provided with vertical grooves, a series of ways for the type-bars or matrices consisting of the upper and lower wires forming guideways or supports for the type-bars along which the latter are adapted to travel and supported by the uprights, said wires having their outer ends terminating within the grooves of the uprights and being provided with the distributive and assemblage portions described, and uprights carried by the table to which said distributive and assemblage portions are secured, and guards secured to the supporting-uprights at a point adjacent to the outer ends of the lower wires, and extending vertically over the grooves in the uprights.

10. In a machine of the character described, the combination with a supporting table or bed, of ways or supports for the type-bars or matrices, each of said ways comprising an upper wire having a distributive portion and a portion adapted to serve as a reservoir for type-bars or matrices, and a lower wire having an assemblage portion and a portion adapted to serve as a reservoir for type-bars or matrices, and a latch or escapement device for each of the reservoir portions of the upper and lower wires, said escapement devices being connected together and adapted to be simultaneously operated to simultaneously release the type-bars from the reservoir portions of the upper and lower wires.

In testimony whereof I affix my signature in presence of two witnesses.

JEROME B. BELL.

Witnesses:
WM. E. BOULTER,
EMMA M. GILLETT.